3,218,283
NOVEL SOLUTIONS OF POLY-(ACRYLIC ANHYDRIDE) AND POLY-(METHACRYLIC ANHYDRIDE) POLYMERS
Wesley L. Miller, Raleigh, N.C., assignor to Monsanto Company, a corporation of Delaware
No Drawing. Filed July 26, 1962, Ser. No. 212,720
4 Claims. (Cl. 260—30.2)

This invention relates generally to new compositions of matter, and specifically to homogeneous, ternary solutions in which one of the components is either a polymer of poly-(acrylic anhydride) or poly-(methacrylic anhydride).

As is generally known, films cannot be cast from polymeric substances, nor can fibers be fabricated therefrom by wet or dry spinning methods without a satisfactory capability for solubilizing the polymer. To our knowledge, this capability has not been provided heretofore for polymers of either poly-(acrylic anhydride) or poly-(methacrylic anhydride). This has been due to the unusual resistance of these polymers to the solvating action of known solvent systems. One explanation for this resistance is the suspected presence of cross-linking in the polymer structure. That is, in the polymerization of non-conjugated dienes to polymer products via a cyclic or intramolecular-intermolecular chain propagation mechanism, it is believed that to some extent cross-linking reactions occur as well as chain propagation reactions. In the polymerization via this mechanism of highly reactive dienes, such as acrylic or methacrylic anhydrides which contain ethylenically unsaturated double bonds conjugated with carbonyl double bonds, it is presumed that cross-linking reactions occur in the polymers formed. This could account for their insolubility in the solvents commonly employed for polymers of this general type.

It is, therefore, a principal object of this invention to provide a solvent mixture suitable for use in preparing solutions of poly-(acrylic anhydride) and poly-(methacrylic anhydride) polymers.

It is a further object of this invention to provide novel polymer containing ternary solutions which may be satisfactorily employed in film casting and fiber fabricating processes.

Other objects will become apparent in the description following.

The compositions meeting the afore-noted objectives are homogeneous ternary solutions comprising (A) from about 1 to 35 weight percent of a polymer selected from the group consisting of poly-(acrylic anhydride) and poly-(methacrylic anhydride); (B) from about 1 to 98 weight percent of a compound selected from the group consisting of dimethyl formamide, dimethylacetamide, dialkyl sulfoxides, aliphatic sulfones, lower aliphatic nitriles, lower aliphatic dinitriles, lactones and N-alkyl pyrrolidinones; and (C) from about 1 to 98 percent by weight of a compound selected from the group consisting of biuret, urea, lower alkyl ureas, thioureas, formamide, thioamides and amines having an ionization constant of from $10^{-3}$ to $10^{-14}$.

As noted, the solvent employed in these novel solutions is a two component system. It is comprised of a compound selected from the group designated hereinabove merely for convenience as (B) together with a compound from the group designated above as (C). It will be recognized that group (B) compounds are known solvents for acrylic-type polymers, but will not, as such readily take polymers of poly-(acrylic anhydride) or poly-(methacrylic anhydride) into solution. Surprisingly, it has been found that when a group (B) compound is combined with those of group (C), with which they are miscible, a solvent system is obtained which is capable of forming clear homogeneous solutions of poly-(acrylic anhydride) and poly-(methacrylic anhydride) polymers with facility and without apparent limitation on polymer molecular weight. The solutions obtained when employing this novel solvent system fully meet the needs required for use in film casting and fiber forming processes.

These novel solutions are prepared merely by intermixing the various components of which they are comprised, i.e., the polymer solute and the two components which comprise the solvent. The order of mixing is not critical, i.e., the polymer can be mixed with one solvent component after which the second component may be added; or alternatively, a miscible mixture of the solvent components may be first prepared and the polymer added thereto. It is generally desirable to employ elevated temperatures, say up to 150° C., when forming the polymer solutions, although solutions can be formed at ambient temperatures. The advantage of an elevated temperature is merely a reduction in the time needed to accomplish complete solution.

For purposes of providing a more descriptive term for the solvent components, they will hereinafter be referred to as the "solvent" component and the "adjuvant" component, respectively. This is, the compounds noted above as belonging to the group (B) designation will be referred to as the "solvent" component while those previously designated as group (C) compounds will be referred to as the "adjuvant" component.

As the "solvent" component there may be employed, dimethyl acetamide and dimethyl formamide; dialkyl sulfoxides, such as dimethyl sulfoxide, diethyl sulfoxide, methylethyl sulfoxide, methyl isopropyl sulfoxide, tetramethylene sulfoxide and pentamethylene sulfoxide; aliphatic sulfones, for example, tetramethylene sulfone (sulfolane), cyclobutene sulfone (sulfolene) and dimethyl sulfone; lower aliphatic nitriles, such as glutaronitrile, succinonitrile, adiponitrile, 2-methyl glutaronitrile, 2-ethyl glutaronitrile and 2,2-dimethyl glutaronitrile; lactones such as γ-butyrolactone, Δ-valerolactone, ε-caprolactone, β-methyl-γ-butyrolactone and N-alkyl pyrrolidinones, such as N-methyl pyrrolidinone, N-ethyl pyrrolidinone and 1,5-dimethyl-2-pyrrolidinone.

As the "adjuvant" component, there may be employed compounds, such as urea; lower alkyl ureas like dimethyl urea and tetramethyl urea; acetyl-urea; thiourea; thioamides, such as thioacetamide and N-methyl thioacetamide; formamide; biuret and amines having an ionization constant in the range of from $10^{-3}$ to $10^{-14}$. The amines may be aliphatic cycloaliphatic, aromatic, primary, secondary or tertiary. Illustrative examples are triethylamine, tri-N-butylamine, pyridine, 2,6-dimethylpyridine, 2-chloropyridine, 2,4,6-triethylpyridine, aniline, dimethylaniline, diethylaniline, ethylmethylaniline, N-methylaniline, N-ethylaniline, o-toluidine, N-methyl-m-toluidine, o-toluidine and p-toluidine.

Although a satisfactory solvent system can be obtained by employing any of the noted "solvent" components in combination with one of the "adjuvants" described as suitable, a particularly outstanding combination is dimethyl formamide with pyridine.

As previously noted, the components making up the novel solutions of this invention may vary over a wide range in concentration. The particular amounts employed in any given instance will, of course, depend on the intended purpose. For example, when employing these solutions for fiber forming purposes a preferred concentration range by weight based on a percentage of the total weight of the solution is from 40 percent to 80 percent for the "solvent" component, from 5 percent to 25 percent for the "adjuvant" component and from 15 percent to 35 percent for the polymer.

In order to elucidate the invention in greater particularity, the following specific examples are presented, it being understood that the intent is merely for purposes of illustration and not limitation.

Example 1

To a 0.1 gm. of poly-(methacrylic anhydride) there was added 1.9 gm. of dry dimethyl formamide with no apparent increase in viscosity observed at room temperature. The mixture was heated to 95° C., but no solution formed. Thereafter, 0.3 gm. of pyridine was added with stirring. Upon heating the resulting mixture to 105° C. the polymer completely dissolved, and a solution was formed within 5 minutes. The final concentration of the solution was 4.4 percent polymer, 83 percent dimethyl formamide and 13 percent pyridine.

Example 2

Poly-(methacrylic anhydride, 2 gm.) was covered with 8 ml. of dry dimethyl formamide, and the mixture was heated to 100° C. for a period of 30 minutes without effecting solution. Upon addition of 1 ml. of dry pyridine, the polymer began to dissolve immediately to yield a clear, viscous dope. The solution was filtered through a coarse sintered glass filter. The filter was then washed with 20 ml. of dimethyl formamide, and the filtrates combined. Fibers of the polymer were prepared by extruding the solution through a fine orifice into a coagulating bath containing a mixture of dimethyl formamide and water. Films of good clarity and strength were also cast from this solution.

Into each of 6 test tubes there was placed 0.5 gm. of poly-(methacrylic anhydride). Dimethyl formamide and pyridine in amounts as shown in the tabulation presented below were then added, and the resulting mixtures were heated to a temperature of 100° C. The mixtures were stirred and the time required to effect complete solution was recorded as shown below.

Example 12

To 1 gm. of poly-(methacrylic anhydride) there was added 9 gm. of a solvent mixture consisting of 10 percent by weight of pyridine and 90 percent by weight of dimethyl sulfoxide. Upon heating this polymer solvent mixture at approximately 90° C. for 4 minutes, a clear, homogeneous solution resulted.

Example 13

To a test tube containing 1 gm. of poly-(methacrylic anhydride) there was added 9 gm. of a solvent mixture consisting of 10 percent by weight of pyridine and 90 percent by weight of adiponitrile. This polymer and solvent mixture was then heated for 11 minutes at a temperature of 90° C. during which time a clear, homogeneous solution formed.

Example 14

To 1 gm. of poly-(methacrylic anhydride) there was added 9 gm. of a solvent mixture consisting of 10 percent by weight of pyridine and 90 percent by weight of γ-butyrolactone. The resulting mixture was then heated at 90° C. for 3 minutes during which time the polymer completely dissolved.

Example 15

Poly-(methacrylic anhydride) in an amount of 0.35 gm. was added to a solvent mixture consisting of 1 gm. of triethylamine and 4 gm. of dimethyl acetamide, both solvent components having been previously dried and purified. The mixture was warmed to temperature of 80° with slight stirring and within 3 minutes a clear, homogeneous solution formed.

Example 16

To 0.5 gm. of poly-(methacrylic anhydride) there was added 4.5 gm. of a solvent mixture consisting of

| Example No. | Polymer, gm. | Pyridine, gm. | Wt. percent of pyridine | Dimethyl formamide, gm. | Wt. percent dimethyl formamide | Percent solids | Time for complete solution (in minutes) |
|---|---|---|---|---|---|---|---|
| 3 | 0.50 | 4.5 | 100 | | 0 | 10 | [1] 8 |
| 4 | 0.50 | 3.375 | 75 | 1.125 | 25 | 10 | 9 |
| 5 | 0.50 | 2.25 | 50 | 2.25 | 50 | 10 | 4.5 |
| 6 | 0.50 | 1.125 | 25 | 3.38 | 75 | 10 | 6.5 |
| 7 | 0.50 | 0.44 | 10 | 4.05 | 90 | 10 | 8 |
| 8 | 0.50 | | 0 | 4.50 | 100 | 10 | [2] |

[1] Gelled on cooling.
[2] Did not dissolve completely in 1 hour and 6 minutes.

Example 9

To 1 gm. of poly-(methacrylic anhydride) there was added a mixture of 25 ml. of dimethyl formamide and 2 ml. of aniline. The mixture was heated at a temperature of 110° for five minutes, during which time complete solution was effected. The dissolved polymer was readily recovered by precipitation with ethyl ether.

Example 10

To 1 gm. of poly-(methacrylic anhydride) there was added 9 gm. of a solvent mixture consisting of 10 percent by weight of urea and 90 percent by weight of dimethyl formamide. The polymer solvent mixture was then placed in a test tube which was heated to a tempertaure of 90° C. Complete solution of the polymer in the solvent mixture was attained in 2 minutes.

Example 11

To 1 gm. of poly-(methacrylic anhydride) there was added 9 gm. of dimethyl formamide and 1 gm. of tetramethylurea. This polymer solvent mixture was then stirred and heated to a temperature of 90° C. The polymer dissolved in the solvent mixture within 2 minutes to form a clear homogeneous solution.

dimethyl formamide and thiourea present in a weight ratio of 9:1, respectively. Upon heating the polymer solvent mixture at approximately 90° C. for 5 minutes, a clear solution resulted.

Example 17

To 0.5 gm. of poly-(methacrylic anhydride) there was added 4.5 gm. of a solvent mixture consisting of dimethyl formamide and formamide present in a weight ratio of 9:1, respectively. Upon heating the resulting mixture for 5 minutes at 100° C., a clear, homogeneous solution resulted.

Example 18

To 0.5 gm. of poly-(methacrylic anhydride) there was added 4.5 gm. of a solvent mixture consisting of acetonitrile and pyridine present in a weight ratio of 9:1, respectively. Upon heating the polymer solvent mixture for 2 minutes, a homogeneous solution formed.

Example 19

To 0.5 gm. of poly-(methacrylic anhydride) there was added 4.5 gm. of a solvent mixture consisting of 9 parts by weight of tetramethylene sulfoxide and 1 part pyridine. Upon heating the resulting mixture for 10 minutes, a homogeneous solution formed.

Example 20

To 0.5 gm. of poly-(methacrylic anhydride) there was added 4.5 gm. of a solvent mixture consisting of 9 parts by weight of dimethyl formamide and 1 part of thioacetamide. Upon heating the mixture at 90° C. for 1 minute, a homogeneous solution was effected.

Example 21

To 0.5 gm. of poly-(methacrylic anhydride) there was added 4.5 gm. of a solvent mixture consisting of 9 parts by weight of N-methyl pyrrolidinone and 1 part of pyridine. Upon heating the mixture for 4 minutes at a temperature of 90° C. a homogeneous, clear solution formed.

Example 22

To 90 gm. of dimethyl formamide there was added 10 gm. of biuret and the mixture was heated to 90° C. to effect solution of the biuret in the dimethyl formamide. To 4.5 gm. of this solvent mixture maintained at a temperature of 90° C. there was added 0.5 gm. of poly-(methacrylic anhydride). Within a period of 2 minutes, there was formed a clear, homogeneous solution.

Example 23

To 90 gm. of dimethyl formamide there was added 10 gm. of acetylurea. This mixture was heated to 90° C. to dissolve the acetylurea. Thereafter, 4.5 gm. of solvent mixture held at 90° C. was added to 0.5 gm. of poly-(methacrylic anhydride). Within 3 minutes a clear solution formed.

Example 24

To 1 gm. of poly-(acrylic anhydride) there was added 9 gm. of a solvent mixture consisting of 10 percent by weight of pyridine and 90 percent by weight of dimethyl formamide. The polymer solvent mixture was then placed in a bath held at a temperature of 90° C. Thereafter, the polymer dissolved in the solvent mixture within 2 minutes to form a clear solution.

Although specific reference has been made to the use of the solutions of this invention for the formation of films and filaments, the invention is not restricted thereto, since the solutions are useful for forming a variety of objects. Among such objects are bristles, ribbons and plasticized or otherwise modified solid compositions for making molded articles.

The properties of the objects formed from the compositions herein described may be modified by introducing various modifying agents in the compositions. Thus, the composition may have incorporated therein such modifying agents as plasticizers, luster modifying agents, and the like.

As many widely different embodiments of this invention may be made without departing from the spirit and scope thereof, it is to be understood that the invention is not limited to any specific embodiments shown but only as defined in the appended claims.

I claim:

1. A spinning solution comprising
   (a) a cross-linked polymer which is difficultly soluble in polar organic solvents, said polymer being selected from the group consisting of poly-(acrylic anhydride) and poly-(methacrylic anhydride),
   (b) a solvent selected from the group consisting of dimethylformamide, dimethylacetylamide, dialkyl sulfoxides, aliphatic sulfones, lower aliphatic nitriles, lower aliphatic dinitriles, lactones and N-alkyl pyrrolidinones,
   (c) and a solvent adjuvant selected from the group consisting of biuret, urea, lower alkyl ureas, thioureas, formamide, acetylurea, thioamides and amines having an ionization constant of from $1 \times 10^{-3}$ to $1 \times 10^{-4}$, said solvent adjuvant being present in a quantity sufficient to enhance the solubility of said polymer in said solvent.

2. The spinning solution of claim 1 which comprises
   (a) from about 15 to 35 weight percent of said polymer,
   (b) from about 40 to 80 weight percent of dimethyl acetamide as the solvent and,
   (c) from about 5 to 25 weight percent of an amine having ionization constant of from $1 \times 10^{-3}$ to $1 \times 10^{-4}$ as the solution adjuvant.

3. The spinning solution of claim 1 which comprises
   (a) from 15 to 35 weight percent of said polymer,
   (b) from about 40 to 80 weight percent of dimethylformamide as the solvent and,
   (c) from about 5 to 25 weight percent of an amine having an ionization constant of from $1 \times 10^{-3}$ to $1 \times 10^{-4}$ as the solution adjuvant.

4. The spinning solution of claim 1 wherein the solvent is dimethylformamide and the solution adjuvant is pyridine.

References Cited by the Examiner

UNITED STATES PATENTS

| | | | |
|---|---|---|---|
| 2,988,541 | 6/1961 | Semon et al. | 260—80 |
| 3,137,660 | 6/1964 | Jones | 260—30.4 XR |

MORRIS LIEBMAN, *Primary Examiner.*

ALEXANDER H. BRODMERKEL, *Examiner.*